UNITED STATES PATENT OFFICE.

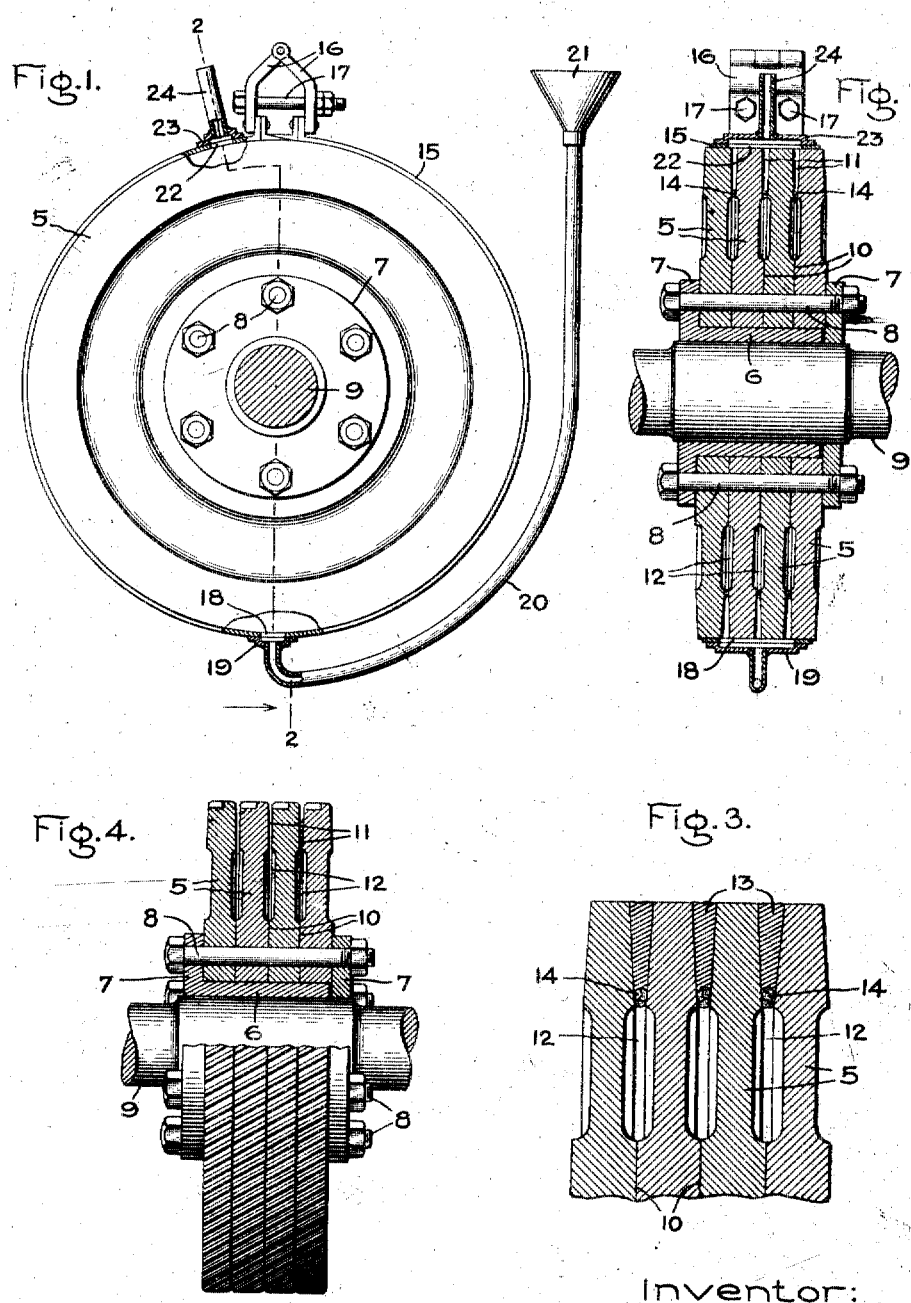

CHRISTIAN STEENSTRUP, OF SCHENECTADY, NEW YORK, ASSIGNOR TO GENERAL ELECTRIC COMPANY, A CORPORATION OF NEW YORK.

METHOD OF MANUFACTURING ELASTIC HELICAL GEAR-WHEELS.

1,280,892.  Specification of Letters Patent.  Patented Oct. 8, 1918.

Application filed November 9, 1917. Serial No. 201,018.

*To all whom it may concern:*

Be it known that I, CHRISTIAN STEENSTRUP, a citizen of the United States, residing at Schenectady, in the county of Schenectady, State of New York, have invented certain new and useful Improvements in Methods of Manufacturing Elastic Helical Gear-Wheels, of which the following is a specification.

The present invention relates to an improved method of manufacturing elastic helical gear wheels of the type which comprises a plurality of disks or laminæ fixed at their central portions on a common support or shaft, and slightly spaced apart at their peripheries to permit of axial yielding under tooth pressure. The teeth on such gear wheels must necessarily be cut with the plates assembled in order to insure that they are correct. It is not possible, however, to cut the teeth on the disks with the peripheral portions spaced apart, as they would yield and vibrate under the pressure of the cutting tool to such an extent that the teeth would not be true. In other words, when the teeth are being cut the peripheries of the disks or laminæ of which the gear wheel is formed must be backed up so as to present a solid blank for cutting.

The object of the present invention is to provide an improved method of manufacturing such gear wheels according to which the disks or laminæ are backed up in an improved manner during the tooth cutting operation so that the teeth may be cut on what is in substance a solid blank.

For a consideration of what I believe to be novel and my invention, attention is directed to the accompanying specification and the claims appended thereto.

In the drawing, Figure 1 is an end elevation of a gear wheel blank and certain apparatus which may be used in carrying out the improved method; Fig. 2 is a section taken on line 2—2, Fig. 1; Fig. 3 is a radial sectional view on an enlarged scale of a portion of a gear wheel illustrating certain steps of the method, and Fig. 4 is a side view partly in section of a finished gear wheel.

According to my improved method the plates, disks or laminæ are formed to the dimension desired in the finished wheel, assembled on a shaft or holder, and fastened into place. This forms the gear wheel blank and it would have the appearance as shown in Fig. 4, except that there are no teeth on it. 5 indicates the plates, disks or laminæ, and 6 a holder upon which they are bolted between two collars 7 by bolts 8, one of such collars being formed integral with the holder 6 and forming in substance a flange. The holder is mounted on a shaft 9. The disks are in engagement with each other adjacent their centers as indicated at 10, and are spaced apart at their peripheries as indicated at 11. In the drawing the width of the spaces between the peripheries of the disks is much exaggerated for purpose of illustration. For example, the width of this space in ordinary practice may be only 0.01″. The spaces between the peripheries of the disks 5 are preferably made slightly wider at their outer portions than at their bottoms. This may be accomplished as shown in Figs. 2, 3 and 4 by tapering the peripheral portions of the disks either on one or both sides. In the present instance they are shown as being tapered on both sides, thus forming spaces which are V-shaped in radial section. As already stated, however, this is much exaggerated in the drawing. The webs or central portions of the disks 5 are thinner than the hubs and the peripheral portions which leave chambers 12 between the webs with which the spaces 11 communicate.

After the blank is assembled I fill the spaces 11 with a substance 13 which has a melting point lower than that of the material of which the disks 5 are made and which is hard at the temperature of the gear blank at which the teeth are to be cut thereon. I preferably use a substance which is hard at ordinary atmospheric temperature and has a relatively low melting point. For example, I have found alloys of bismuth, lead and tin, or of bismuth, lead tin and cadmium, which alloys are ordinarily known as "fusible metal", satisfactory. Such an alloy is sufficiently hard at ordinary atmospheric temperatures to firmly back up the disks while the teeth are being cut, and has a low melting point, the melting point depending on the proportion of the metals in the alloy as is well known. I preferably employ such an alloy having a melting point lower than the boiling temperature of water. A temperature of 90° C. is satisfactory. The substance 13 is poured in the spaces 11 in a molten state and allowed to cool and harden and to confine the substance to the spaces 11 and prevent it running down into the chambers 12 I form a dam at the bottom of each of the spaces 11 prior to pouring the molten substance into them. The dam may be formed by forcing or pulling a piece of soft wire or piece of string or cord, or similar material 14 down into the spaces 11 as indicated in Figs. 2 and 3. I have found ordinary soft cord satisfactory and it may be forced down into the spaces 11 by a thin tool or other suitable means. Since cord is soft it will be compressed readily to fit the bottom of the spaces 11 which may be not of uniform width at all points around the wheel. One, two or more turns of the cord or other similar material may be utilized as found desirable. The purpose of making the spaces 11 wider at the radial outer portion than at their radially inner ends or bottoms is to permit of the ready introduction of the cord and of the wedging of it down into the bottoms of the spaces 11. It also facilitates its removal.

To facilitate the introduction of the substance 14 into the spaces 11 I place a suitable band 15, as shown in Figs. 1 and 2 around the blank. This band may be made of thin metal or other suitable material and is provided at its ends with means for clamping it tightly around the blank. In the present instance the ends of the band are shown as being fastened to a pair of hinged members 16 which may be squeezed together by bolts 17 to bring the band tightly around the blank. The band 15 is provided with a transverse opening 18 over which is fitted a cap 19 to form a filling chamber. Connected to the filling chamber is a pipe or conduit 20 having a funnel 21 at its free end. At a point about diametrically opposite to the transverse opening 18 is a second transverse opening 22 over which is fastened a cap 23 to form an air discharge chamber. Communicating with this chamber is a short discharge pipe 24. The transverse openings 18 and 22 are as shown in Fig. 2 of a width sufficient to include all of the spaces 11. To introduce the molten material into the spaces 11 the band 15 is put into place on the blank as shown in Figs. 1 and 2, and the blank is held in position so that the filling chamber is at the bottom and the discharge pipe 24 is at the top. The molten substance is then poured into the funnel 21 from which it runs down through the pipe or conduit 20 and up into the spaces 11, the funnel 21 being held at a higher level than the top in the blank. The purpose of introducing the molten substance at the bottom of the blank is to prevent the formation of air pockets. With this arrangement is air is driven up ahead of the molten substance as it flows into the spaces 11 and is discharged through the pipe 24. To prevent chilling and hardening of the molten substance while it is being poured into the spaces 11, the gear blank may be heated to a desired degree by inserting it into a hot bath or otherwise. For example, in the case of a substance 13 which has a melting point lower than the boiling temperature of water, the entire blank may with advantage be immersed in a bath of hot water and heated to a temperature sufficiently high to prevent the chilling and hardening of the molten substance. After the spaces 11 are entirely filled the blank, if it has been inserted in a bath of hot water, is removed and allowed to cool, which will result in the hardening of the substance 13. After the substance 13 has hardened the band 15 is removed and the teeth are cut on the blank in the usual manner. The gear wheel is then heated by placing it in a hot bath or otherwise to melt out the material 13 after which the wires, strings or cords 14 are removed, leaving a completed gear wheel, as shown in Fig. 4. In the case where a substance 13 is used having a melting point lower than the temperature of boiling water, the wheel can conveniently be immersed in hot water to melt the substance 13. It will be understood, however, that it may be heated in any other way found desirable or advantageous.

The above described method has the advantage that the plates or disks 5 are maintained in the exact positions during the tooth cutting operation which they will occupy in the finished gear wheel and there is accordingly no danger of their springing or moving on the removal of the material 13 which backs them up during the cutting operation. In other words, there is no danger of any of the disks being held under tension or compression during the cutting operation. It may occur, for example, that some of the disks or plates 5 are slightly warped or sprung. Or they may have inaccuracies near the peripheries. Under these circumstances the disks may be slightly closer to each other at some points around the peripheries than at others. The string, cord, or wire 14 which forms the dam will not spring the disks, however, but will be compressed and deformed to fit into the spaces 11 at any point. This is illustrated in an exaggerated manner in Fig. 3. Likewise the molten substance or material 13 which is poured in will fill the spaces 11 leaving the plates or disks in their normal positions. It follows, therefore, the disks 5 will occupy exactly the same relative positions in the finished gear wheel that they occupied during the cutting operations.

In accordance with the provisions of the patent statutes, I have described my invention and the particular method which I now consider to represent the best manner for carrying it out, together with suitable apparatus which may be utilized; but I desire to have it understood that the particular method and apparatus shown is only illustrative, and that the invention can be carried out in other ways such as come within the scope of the appended claims.

What I claim as new and desire to secure by Letters Patent of the United States, is:—

1. The method of manufacturing gear wheels comprising a plurality of disks clamped together at their central portions and slightly spaced apart at their peripheries, which comprises assembling the disks to form a blank, filling the spaces at the peripheries of the disks with a substance which has a lower melting point than the material of which the disks are formed, cutting teeth on the blank, and removing the substance in said spaces by heating it until it melts and runs out.

2. The method of manufacturing gear wheels comprising a plurality of disks clamped together at their central portions and slightly spaced apart at their peripheries, which comprises assembling the disks on a holder to form a blank having spaces between the disks at their peripheries, placing dams in said spaces, filling the spaces outside the dams with a molten substance which has a lower melting point than the material of which the disks are formed, cutting teeth on the blank after the filling substance has hardened, and removing said filling substance by heating.

3. The method of manufacturing gear wheels comprising a plurality of disks clamped together at their central portions and slightly spaced apart at their peripheries, which comprises assembling the finished disks on a holder to form a blank having spaces between the disks at their peripheries, inserting strands in said spaces to form dams, placing a band having a filling opening around the blank, pouring a molten substance which has a lower melting point than the material of which the disks are formed into said filling opening from which it runs into said spaces, removing the band after said substance has hardened, cutting teeth on the blank, removing said filling substance by heating, and removing said strands.

4. The method of manufacturing gear wheels comprising a plurality of disks clamped together at their central portions and slightly spaced apart at their peripheries, which comprises finishing the disks so that they have a slight taper at their outer portions, assembling the disks to form a blank with spaces between their outer portions which are wider at the periphery of the wheel than at their bottoms, placing members at the bottoms of said spaces to form dams, filling the spaces with a metal which is hard at ordinary temperatures and which melts at a relatively low temperature, cutting teeth on the blank, removing said filling metal by heating it until it melts, and removing said dams.

5. The method of manufacturing gear wheels comprising a plurality of disks clamped together at their central portion and slightly spaced apart at their peripheries, which comprises assembling the disks to form a blank, placing a band having a filling opening around the blank, introducing a molten substance through said filling opening into the spaces between the disks, removing said band after the substance has hardened, cutting teeth on the blank, and removing said filling substance by melting it.

6. The method of manufacturing gear wheels comprising a plurality of disks clamped together at their central portions and slightly spaced apart at their peripheries, which comprises assembling the disks to form a blank, placing a band having a filling opening at its bottom, and a vent opening at its top around the blank, introducing a molten substance through said filling opening into the spaces between the disks, removing said band after the substance has hardened, cutting teeth on the blank, and removing said filling substance by melting it.

7. The method of manufacturing gear wheels comprising a plurality of disks clamped together at their central portions and slightly spaced apart at their peripheries, which comprises assembling the disks to form a blank, filling the spaces between the peripheries of the disks with a substance which fuses at a low temperature, cutting teeth on the blank, and removing said filling substance by immersing the gear wheel in a hot bath to melt the filling substance.

8. The method of manufacturing gear wheels comprising a plurality of disks clamped together at their central portions and slightly spaced apart at their peripheries, which comprises assembling the disks to form a blank, placing a band having a filling opening around the blank, immersing the blank in a hot bath, introducing a molten substance through said filling opening into the spaces between the disks, removing the blank from the bath and permitting it to cool and the substance to harden, removing the band, cutting teeth on the blank, and immersing the gear wheel in a hot bath to melt the filling material.

9. The method of manufacturing gear wheels comprising a plurality of disks clamped together at their central portions and slightly spaced apart at their peripheries, which comprises assembling the disks to form a blank, filling the spaces between the peripheries of the disks with a substance which fuses at a temperature lower than the boiling temperature of water, cutting teeth on the blank, and removing said filling by immersing the gear wheel in a bath of hot water to melt the filling substance.

10. The method of manufacturing gear wheels comprising a plurality of disks clamped together at their central portions and slightly spaced apart at their peripheries, which comprises assembling the disks to form a blank, placing a band having a filling opening around the blank, introducing a molten substance through said filling opening into the spaces between the disks, removing said band after the substance has hardened, cutting teeth on the blank, and removing said filling substance.

11. The method of manufacturing gear wheels comprising a plurality of disks clamped together at their central portions and slightly spaced apart at their peripheries, which comprises assembling the disks with a substance between the peripheries of them which has a melting temperature lower than that of the material of which the disks are formed, cutting teeth on the blank thus formed, and removing the substance in said spaces by heating.

12. The method of manufacturing gear wheels comprising a plurality of disks clamped together at their central portions and slightly spaced apart at their peripheries, which comprises assembling the disks to form a blank, placing a band having a filling opening around the blank, heating said blank, introducing a molten substance through said filling opening into the spaces between the disks, removing said band after the substance has hardened, cutting teeth on the blank, and removing said filling substance.

In witness whereof, I have hereunto set my hand this 6th day of November 1917.

CHRISTIAN STEENSTRUP.